3,289,155
SEISMIC ACCELERATION DETECTOR
Alvin L. Parrack, Bellaire, and Steven A. Stubblefield, Houston, Tex., assignors to Texaco Inc., New York, N.Y., a corporation of Delaware
Filed Sept. 24, 1965, Ser. No. 497,586
7 Claims. (Cl. 340—17)

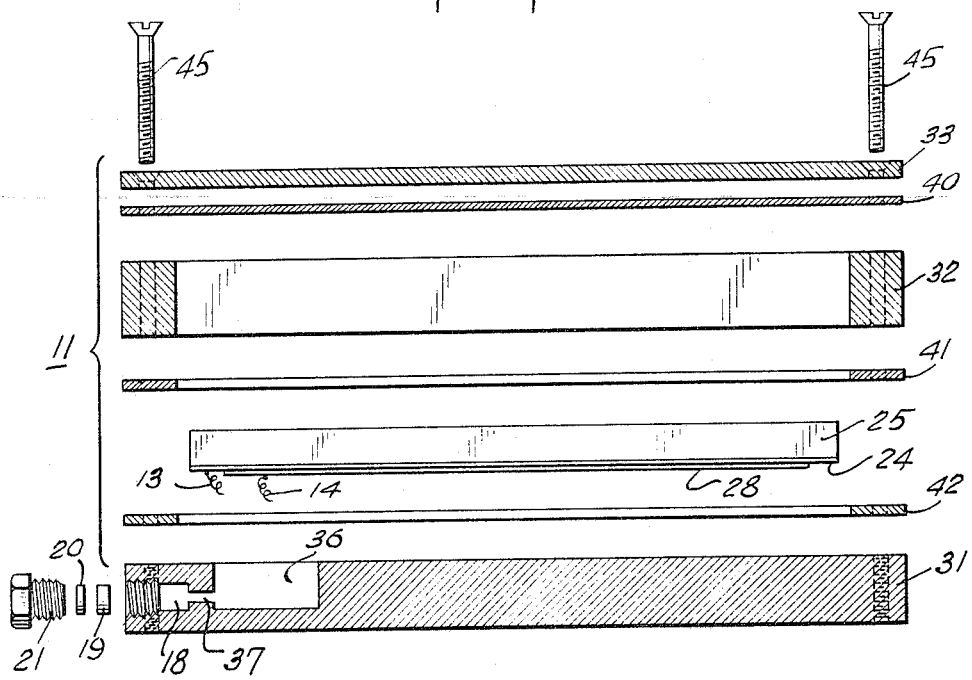
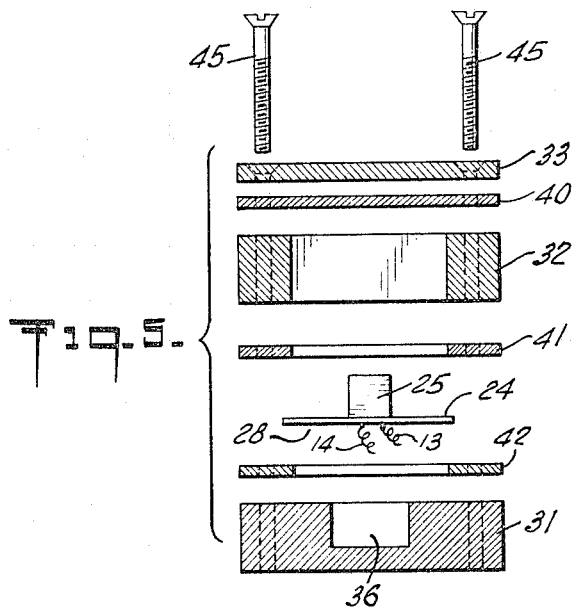

This application is a continuation-in-part application of Serial Number 151,587, filed September 15, 1961, now abandoned.

This invention is concerned with a mechanical movement transducer. More specifically the invention concerns a seismic application for such a transducer. Further, a transducer according to this invention is one that may be characterized as an acceleration type detector.

Various attempts have been made heretofore to provide more sensitive seismic detectors. However, such prior proposals have been only variously successful and to limited extent. Consequently, it is an object of this invention to provide an improved acceleration type of seismic detector which is able to provide an output voltage proportional to the vertical acceleration of the case of the detector.

It is another object of this invention to provide an improved yet simple and rugged seismic detector that has a minimum of moving parts and that is able to provide an output of high sensitivity while at the same time maintaining a linear output characteristic expressed in terms of decibels and derived from a constant velocity of sinusoidal motion as related to the frequency in cycles per second.

It is another object of this invention to provide an acceleration type seismic detector in which the impedance is easily adjusted without affecting the voltage sensitivity and frequency response.

Briefly, the invention concerns a seismic acceleration detector comprising an elongated housing which supports the longitudinal edges of an elongated spring member. An elongated inertia mass is supported along the entire longitudinal dimension of the spring member intermediate the held longitudinal edges, the inertia mass having a substantially smaller width than the spring member. The invention also comprises a piezoelectric crystal transducer means which has one face bonded to a face of the spring member and which extends a predetermined distance co-longitudinally with the spring member to provide the necessary capacitance to establish the desired impedance of the detector. The accelerations of the housing producing mechanical vibrations of the spring member and crystal transducer thereby converting the accelerations to electrical signals of a predetermined strength.

The foregoing objects and benefits of the invention may be more fully appreciated in connection with a more detailed description which follows and which is illustrated in the drawings, in which:

FIGURE 4 is a longitudinal cross-section view, showing in an exploded manner the entire detector that is illustrated in FIGURE 1;

FIGURE 5 is a transverse cross-section exploded view, showing the same elements that are shown in FIGURE 4.

Figure 1:
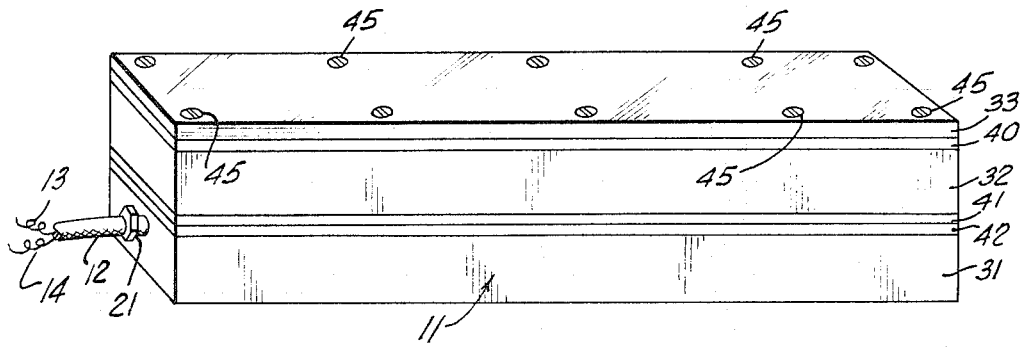
FIGURE 1 is a perspective assembled view showing a detector structure according to the invention.

Throughout this description wherever it appears, the term piezoelectric is intended to be employed in its broadest sense so as to include materials which are sometimes referred to as ferroelectric in their properties as distinguished from earlier known piezoelectric crystal materials.

Referring to FIGURES 1 thru 5, it will be observed that the structure of a detector according to the invention is illustrated. There is a housing 11 that is generally elongated and rectangular in its configuration and presents a closed casing structure which may be electrically connected to an output circuit by means of an electrical cable 12 (FIG. 1) that contains a pair of lead wires 13 and 14 therein. The cable 12 may be fastened to the housing 11 for providing a water tight connection. This may be done in a conventional manner such as that illustrated wherein the cable 12 extends into a socket 18 (FIG. 4) located at one end of the housing 11. The cable will be compressed within the socket while a seal is formed at the walls of the socket by means of a soft flexible washer 19 and a thin stiff washer 20 that will be pressed against washer 19 by a threaded hollow bolt 21 which screws into an internal thread portion at the outside end of socket 18.

Figure 2:
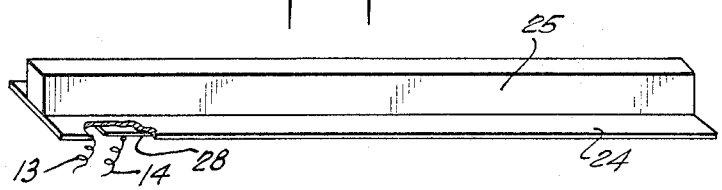
FIGURE 2 is a perspective view of the active elements that are supported on the inside of the detector casing, partly broken away to illustrate electrical connection with the electrodes.
Figure 3:
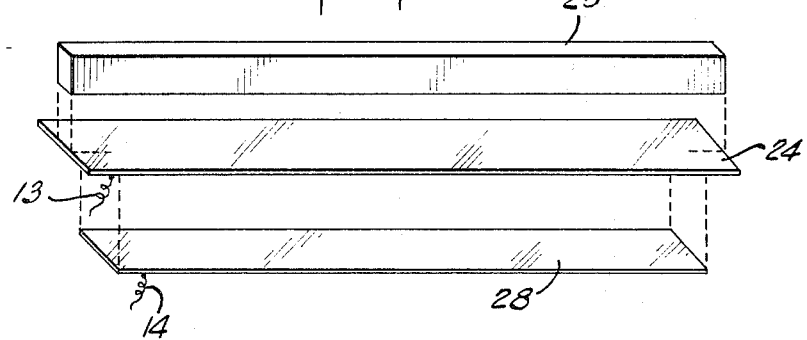
FIGURE 3 is a perspective exploded view showing each of the three elements involved in the FIGURE 2 illustration, but separated for individual illustration of the details thereof.

The active elements of the detector are illustrated by themselves in FIGURES 2 and 3 and they comprise a rectangular flat spring 24 which has securely bonded on the upper surface thereof a centrally located rectangular mass 25. The spring 24 may take any feasible form and be constructed of any suitable material but is preferably made of phosphor bronze. Similarly, the mass 25 may be made of any feasible material and may take any suitable form, but is preferably made of lead or brass. It will be observed that the rectangular mass 25 is a solid block of material and has a substantially shorter transverse dimension than the width of the spring 24. This construction is to provide an adequate amount of spring surface along the edges thereof that is free for flexing transversely of the spring element itself.

Bonded to the under surface of spring 24 (when in an upright position as shown in the drawings) there is a thin rectangular crystal 28 that has integrally formed thereon conductive material electrodes (surface coatings) on both its upper and lower faces. The crystal 28 may be any piezoelectric type material, but is preferably a material sometimes considered as being ferroelectric in nature. Specifically, the material of which crystal 28 is made is a lead zirconate titanate crystal compound. This crystal will be treated so as to have its polarization set up in such a manner that changing of the thickness of the crystal material will produce a voltage across the electrodes thereof. The upper electrode, or face, of the crystal 28 is securely bonded in an electrically conductive manner to the under surface of the spring 24. Such an arrangement acts so as to provide an electrical circuit that extends from the upper face electrode of crystal 28 and out through the wire 13 via the spring 24 to which wire 13 is soldered or otherwise attached for good electrical connection therewith. The other electrode of crystal 28 is connected to the wire 14 by having this wire 14 soldered, or otherwise electrically connected to the lower electrode face of crystal 28. It is to be noted that the electrode faces of the crystal 28 are preferably constructed by silvering the surfaces thereof.

The housing and spring 24 are elongated in order to accommodate the piezoelectric crystal 28. The crystal length is determined in accordance with the desired impedance of the detector. The output impedance of the detector is inversely proportional to the crystal capacitnace in accordance with the formula for impedance $$Z = \frac{1}{2\pi f C}$$

where:

$Z$ = impedance
$f$ = frequency
$C$ = capacitance

The capacitance of the crystal is proportional to the area of the crystal as can be seen from the following formula $$C = \epsilon \frac{A}{d} = \epsilon \frac{\text{width} \times \text{length}}{\text{thickness}}$$

$\epsilon$ being a constant and C representing capacitance. It can be seen from the above, for example, that doubling the length dimension of the crystal 28 will double the capacitance and accordingly halve the output impedance and make more signal power available to attached devices without affecting the voltage sensitivity or frequency response of the detector.

It will be appreciated that a detector having a sufficiently long crystal therein will be of sufficiently low impedance to feed a low input impedance device such as a seismic amplifier, which could not normally be driven by a crystal transducer.

Since the crystal 28 is bonded to the spring 24 there is no structural change of the detector necessary to change the impedance other than changing the length of the crystal 28.

It is to be especially noted that when the detector is assembled for use the active elements (that are all attached to the spring 24) are all supported centrally of the housing 11 and in such a manner that the spring 24 is only fastened along the longitudinal edges thereof. This structure may be observed most clearly in FIGURES 4 and 5 where the detailed elements making up housing 11 are shown. The housing comprises three members 31, 32 and 33 which may be made of any feasible, relatively stiff material having sufficient strength. Preferably they are constructed of aluminum. The lowermost element 31 has a well or similar hollow portion 36 which is located beneath the electrode connections of wires 13 and 14. There is, of course, a connecting passageway 37 to provide for the wires 13 and 14 to go from the clamped end of cable 12 within socket 18, to the well area for free moving mechanical connection with the spring 24 and attached crystal 28.

The central body portion of housing 11 is made up of the member 32 which takes the form of a hollow frame so as to provide ample space and clearance for the active elements of the detector to be located for free movement relative to the housing therein. At the top of the housing unit there is the member 33 which is in the form of a plate that when assembled lies directly over the top of the central member 32, with a gasket 40 therebetween to provide a moisture tight seal. Between the central member 32 and the base member 31, there is a pair of gaskets 41 and 42 that in each case have such dimensions as to provide for clamping and securely holding the longitudinal edges only of the spring 24. At the same time the internal longitudinal dimensions of the gaskets 41 and 42 leave the transverse edges or ends of the spring 24 entirely free and unobstructed.

The foregoing dimensions are illustrated clearly in FIGURES 4 and 5, where it will be observed in FIGURE 5 that the edges of the spring 24 extend beyond the internal width of the opening within each of the gaskets 41 and 42. This provides for clamping and holding the longitudinal edges of the spring 24. Similarly it will be observed in FIGURE 4 that the ends of the spring 24 do not extend as far as the internal length of the openings within gaskets 41 and 42. The result of this construction is such that when the detector is assembled the gaskets will clamp and hold the longitudinal edges of the spring 24 but leave free and without any contact the transverse shorter ends of the spring and crystal. In the assembly of the entire housing unit 11, there may be employed a sufficient number of machine screws 45 to be received by threaded holes in the base member 31 in order to provide adequate and even clamping, in an obvious manner as illustrated.

It is pointed out that, in operation, the detector would be placed flat upon the surface of the ground in the position illustrated in FIGURE 1, and then upon receipt of seismic wave energies the acceleration of the ground movement would act upon the housing 11 causing it to accelerate therewith. It will be understood that the reaction internally would be created by reason of the inertia of mass 25 which would thus cause the spring 24 to be flexed in accordance with the acceleration forces which are created by the relative action between casing 11 and spring supported mass 25. The acceleration and movement thus created will tend to flex the spring 24 transversely, between the longitudinal edges thereof and such flexure will cause stresses to be produced in the crystal 28. A principal one of these stresses tends to change the width of the crystal 28 which in turn changes the thickness of the crystal. Now, it will be recalled that the crystal has been polarized in such a manner as to produce a voltage thereacross as the thickness is changed. Consequently the resulting change in thickness which is created in crystal 28 will produce an output voltage between the electrodes and thus between the electrically connecting circuit wires 13 and 14. This voltage will have substantial magnitude.

Figure 6:
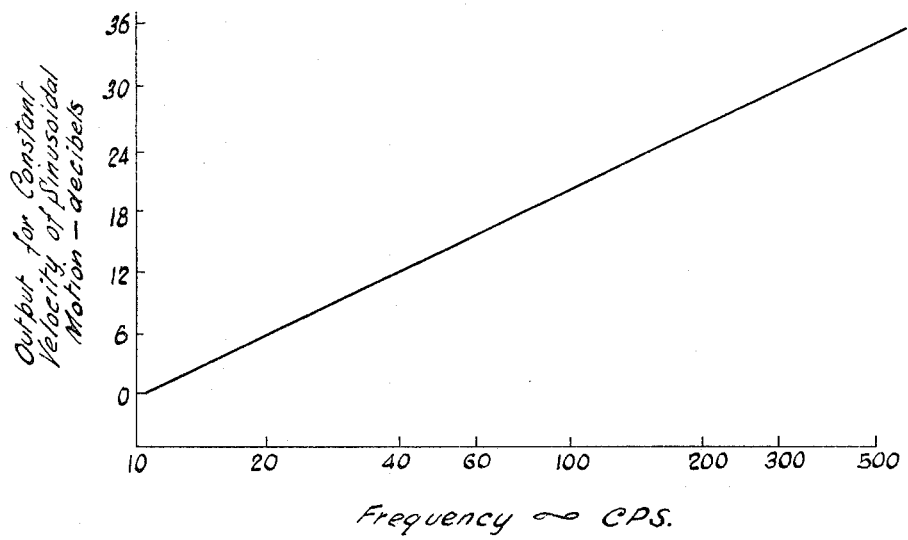
FIGURE 6 is a graph illustrating the output of a detector according to this invention in terms of decibels as related to frequency in cycles per second.

It is to be particularly noted that by reason of the structure employed, wherein the spring is clamped only along its longitudinal edges, the action created is definitely not that of a diaphragm. This is beneficial in creating the desired output signals which are highly superior to anything heretofore known. In this regard reference may be had to FIGURE 6 where there is shown a curve illustrating the relationship between the output of the detector obtained for constant velocity of a sinusoidal motion, which output is expressed along the ordinate in terms of decibels. The abscissa of the curve has it units set up in terms of frequency in cycles per second. It is to be observed that the output of the detector is a straight line function, and that there is an increase of six decibels per octave which is the same as the increase in acceleration. Thus, it is to be observed that the detector according to this invention is of a superior nature and has many advantages.

While a particular embodiment of the invention has been illustrated and described in considerable detail in accordance with the applicable statutes, this is not to be taken as in any way limiting the invention but merely as being descriptive thereof.

We claim:

1. A seismic acceleration detector comprising an elongated housing, an elongated spring member having substantially parallel longitudinal edges fixedly supported by said housing, an elongated inertia mass supported along the entire longitudinal dimension of said spring member intermediate said longitudinal edges, said inertia mass having a substantially smaller width than said spring member, a piezoelectric crystal transducer means having one face bonded to a face of said spring member, the dimension of said crystal transducer means co-longitudinal with said spring member being selected to provide the necessary capacitance to establish the desired impedance of said detector whereby accelerations of said housing produces mechanical vibrations of said spring member and crystal transducer means thereby converting said accelerations to electrical signals of predetermined strength.

2. A seismic acceleration detector according to claim 1, wherein an electric circuit connection means is provided for connecting said piezoelectric transducer means into an output circuit.

3. A seismic acceleration detector comprising an elongated rectangular housing, a thin flat elongated rectangular spring member having substantially parallel longitudinal edges fixedly supported by said housing, an elongated rectangular inertia mass supported along the entire longitudinal dimension of said spring member intermediate said longitudinal edges, said inertia mass having a substantially smaller width than said spring member and adapted to flex said spring member transversely, a piezoelectric crystal transducer means having one face bonded to a face of said spring member, the dimension of said crystal transducer means co-longitudinal with said spring member being selected to provide the necessary capacitance to establish the desired impedance of said detector whereby accelerations of said housing produces mechanical vibrations of said spring member and crystal transducer means thereby converting said accelerations to electrical signals of the predetermined strength.

4. A seismic acceleration detector according to claim 1, wherein said piezoelectric crystal transducer means includes a thin flat elongated rectangular piezoelectric member having electrodes on two faces thereof.

5. A seismic acceleration detector according to claim 4, wherein said piezoelectric member comprises a lead zirconate titanate material.

6. A linear seismic acceleration detector comprising a housing for supporting the acceleration responsive elements, a thin flat rectangular elongated spring fixedly connected to said housing along the longitudinal edges thereof, a thin flat elongated rectangular piezoelectric crystal having electrically conductive material on both faces thereof, an elongated rectangular inertia mass extending substantially along the entire longitudinal dimension of said spring means and having a width substantially less than the width of said spring, said mass being bonded to one side of said spring, said crystal being bonded over substantially the entire surface thereof to the other side of said spring, gasket means carried by said housing for firmly supporting said spring means along said longitudinal edges only, said gasket means having a configuration such that the transverse edges of said spring are entirely free, whereby acceleration of said housing causes transverse flexure of said spring due to relative reaction with respect to said mass and said housing and such flexure in turn causes change in thickness of said crystal.

7. A linear seismic acceleration detector according to claim 6, wherein said piezoelectric crystal extends a predetermined distance parallel to the longitudinal edges of said spring member supported by said housing to provide the necessary capacitance to establish the desired impedance of said detector.

No references cited.

BENJAMIN A. BORCHELT, *Primary Examiner.*

M. F. HUBLER, *Assistant Examiner.*